No. 742,200. Patented October 27, 1903.

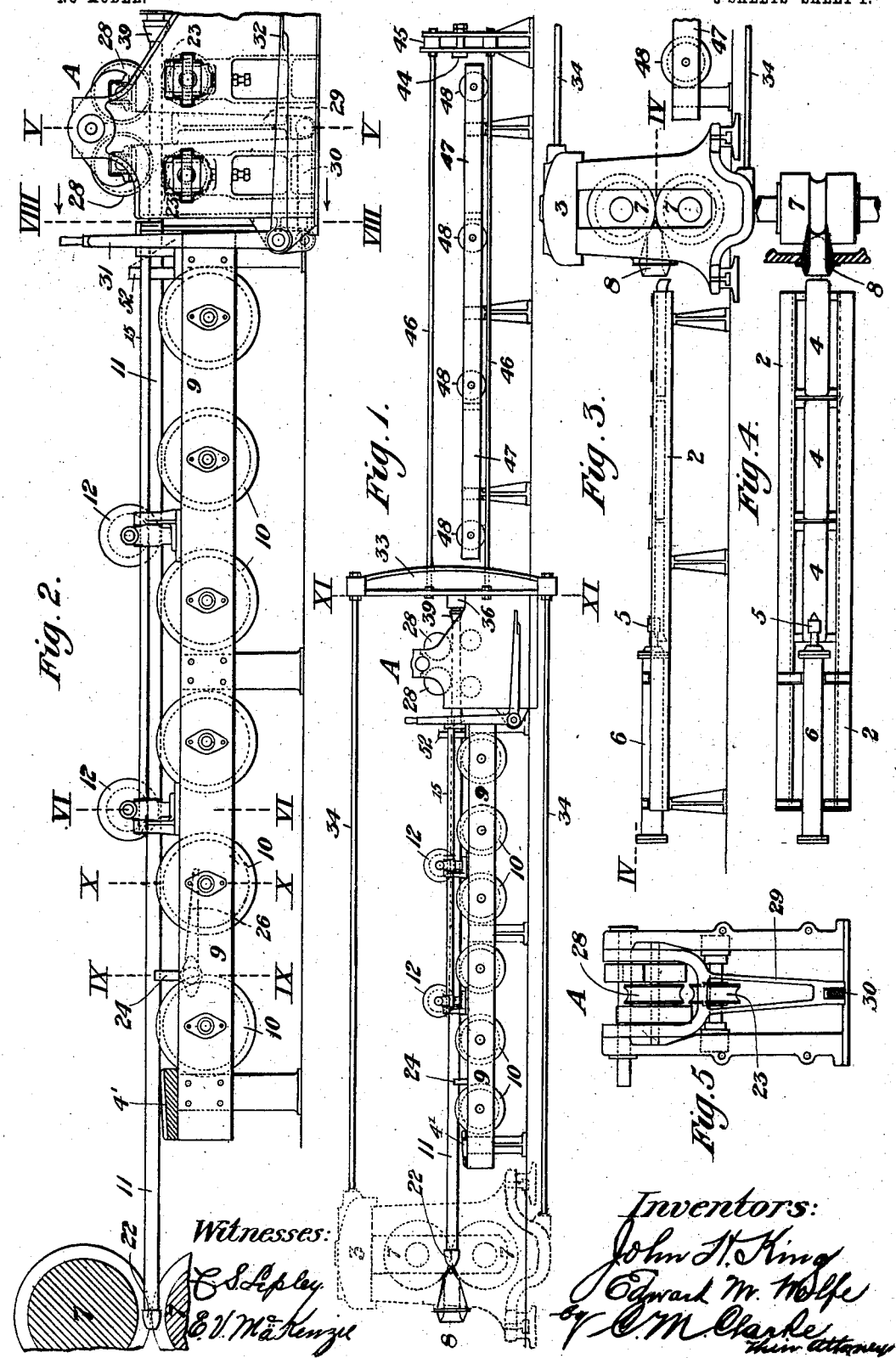

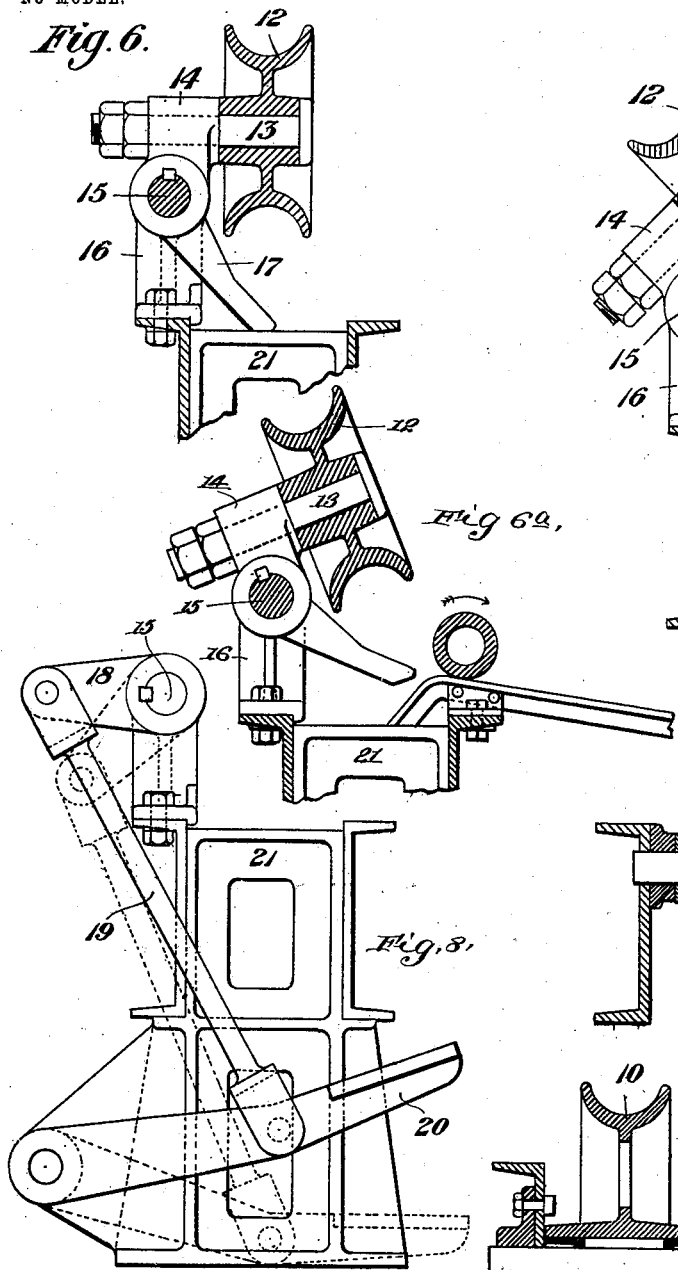

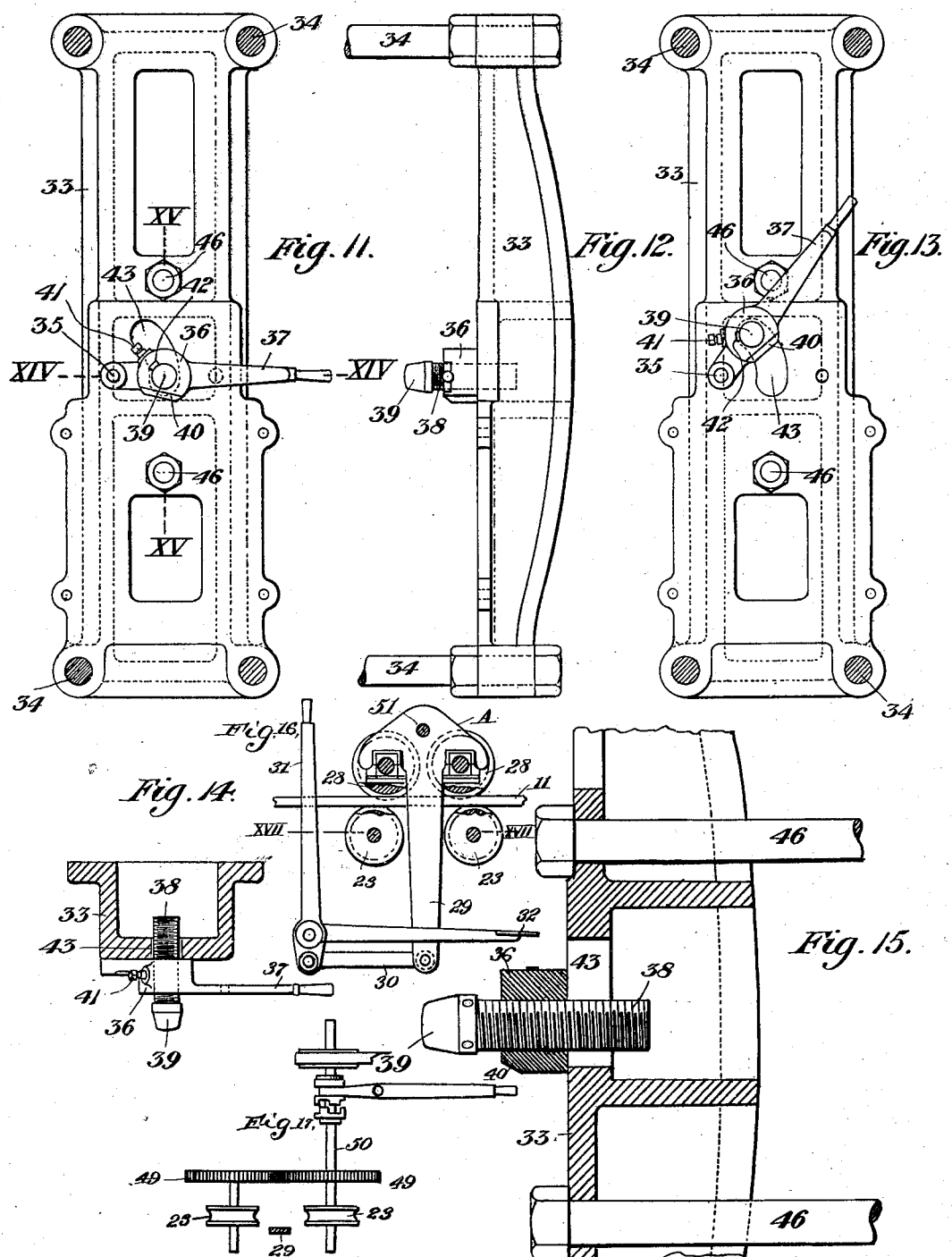

UNITED STATES PATENT OFFICE.

JOHN H. KING AND EDWARD M. WOLFE, OF BEAVERFALLS, PENNSYLVANIA, ASSIGNORS OF ONE-THIRD TO GEORGE H. BLAXTER, OF PITTSBURG, PENNSYLVANIA.

APPARATUS FOR MANUFACTURING SEAMLESS TUBING.

SPECIFICATION forming part of Letters Patent No. 742,200, dated October 27, 1903.

Application filed December 26, 1901. Serial No. 87,361. (No model.)

*To all whom it may concern:*

Be it known that we, JOHN H. KING and EDWARD M. WOLFE, citizens of the United States, residing at Beaverfalls, in the county of Beaver and State of Pennsylvania, have invented certain new and useful Improvements in Apparatus for Manufacturing Seamless Tubing, of which the following is a specification, reference being had therein to the accompanying drawings, forming part of this specification, in which—

Figure 1 is a view in side elevation of a portion of our improved tube-manufacturing apparatus. Fig. 2 is a similar view, on an enlarged scale, of a portion of the apparatus, showing the means for manipulating the bar. Fig. 3 is a similar view showing the feeding portion of the plant to the left of the roll-housing indicated by Fig. 1. Fig. 4 is a plan of Fig. 3 indicated by the line IV IV of Fig. 3. Fig. 5 is a cross-sectional view on the line V V of Fig. 2. Fig. 6 is a cross-sectional detail view, on an enlarged scale, taken on the line VI VI of Fig. 2. Fig. 6$^a$ is a similar view showing the upper grooved roller and arm partially raised, illustrating the process of discharging the tube. Fig. 7 is a similar view showing the upper grooved roller and arm raised to the limit of their travel. Fig. 8 is an end view of the table looking toward the rolls, indicated by the line VIII VIII of Fig. 2. Fig. 9 is a cross-sectional view indicated by the line IX IX of Fig. 2. Fig. 10 is a similar view indicated by the line X X of Fig. 2. Fig. 11 is a face view of the cross-head, indicated by the line XI XI of Fig. 1. Fig. 12 is a side view of the cross-head. Fig. 13 is a face view thereof similar to Fig. 11, but showing the limiting-stop raised out of the way. Fig. 14 is a cross-sectional view on the line XIV XIV of Fig. 11. Fig. 15 is a vertical sectional view indicated by the line XV XV of Fig. 11. Fig. 16 is a view of the extractor, partially in section. Fig. 17 is a horizontal plan of the lower feed-rollers and driving-gearing therefor, indicated by the line XVII XVII of Fig. 16.

Our invention relates to the manufacture of seamless tubing from a previously-prepared hollow billet; and it consists in means for forcing the said hollow billet over a ball between rolls, then over guiding-rolls, together with means for supporting the mandrel, releasing the upper guiding-rolls, manipulating the bar, and other details of construction, which will be more fully hereinafter set forth.

Referring now to the drawings, 2 is a table in advance of the grooves of the mill 3, upon which table are mounted trough-sections 4, provided with grooves in the upper portion, through which the blank is forced by a head 5 and a piston-rod mounted in a fluid-actuated cylinder 6, which cylinder is likewise supported upon the table 2.

Immediately in advance of the usual grooved rolls 7 7 of the mill is set a bell-mouthed guide 8, adapted to receive the blank and to maintain it in cylindrical form and to introduce it to the rolls 7, which bell-mouthed guide will also prevent any buckling or distorting of the tube near to the rolls, while also tending to reduce any irregularities therein before entering the roll-pass. Beyond the rolls is mounted a table 9, upon the forward end of which is a short section of trough 4', adapted to receive the ball and to deliver it upon the end of the forwardly-traveling mandrel. As the mandrel is drawn backwardly after the rolling operation, the tube being stripped therefrom, the detachable ball is released by the tube and will remain in the trough 4'. Upon advancing the mandrel 11 for the next operation the ball is picked up by the point of the mandrel, being adjusted, if necessary, by the workman. In the table is rotatably mounted, preferably upon friction-rolls, as indicated in Fig. 10, a series of grooved rollers 10, adapted to receive the tube in process as it advances over the mandrel 11 and to support it in alinement therewith, while at suitable locations above the grooved rolls 10 are mounted similarly-grooved rollers 12 for the like purpose of maintaining the tube in alinement by providing an upper bearing at different points along the length of the table. These upper rolls 12 are preferably mounted in such a manner that they may be thrown up out of engagement with the tube, and for this purpose they are mounted upon the inner ends of supporting-studs 13, which studs are mounted in upper ends of gudgeons 14, keyed upon and carried by a common rotating shaft 15, supported in bearings 16, extending upwardly from the main frame of the table 9. Below the grooved wheels 12 and at any suitable position upon the shaft 15 or secured to or made integral with the gudgeons 14 are the downwardly and inwardly extending arms 17, adapted to be actuated by the shaft 15, so that when the wheels 12 are thrown up, as indicated in Figs. 6ª and 7, such arms moving in conformity with the wheels 12 will lift the tube out of the grooves of the rollers 10 and will discharge it by gravity upon any suitable table or platform at one side, as also indicated in Fig. 6ª.

The shaft 15 is partially rotated from one end of the table 9 by means of a crank 18, pitman 19, and treadle-lever 20, the weight of the rollers 12 and arm 17 returning it to normal position after pressure upon the treadle is released, while further downward movement is limited by the ends of the arms bearing upon the cross-frame of the table 21, as clearly shown in Fig. 6.

The pressure-mandrel 11 is provided at its forward end with the usual ball 22, mounted between the rolls 7 in proper position to form the tube, the rear end of the mandrel resting upon the grooved rollers 23 of the mandrel-extractor, (indicated at A in Figs. 1 and 2.) In the normal position the mandrel is supported at its forward end upon an upwardly-extending fork or trunnion 24, pivotally mounted upon shaft 25, journaled in the frame 9, to which shaft 25 is secured a lever 26, which rests upwardly in the normal position of the support, as shown in Fig. 2, against a projecting pin 27, as shown in Fig. 10, thus preventing the support from tipping forwardly. During the period of rest the mandrel 11 bears downwardly upon such support, maintaining it in its normal upright position until the advancing tube comes into contact with it or until the mandrel 11 is fed backwardly, when the support will, by reason of the weight of arm 26, fall out of the way, thus leaving clearance for the advancing tube. The mandrel 11 is manipulated either forwardly or back by means of the mandrel-extractor, (indicated at A,) but such apparatus being old does not form any part of the present invention. In this device the mandrel is fed forward or back by depressing one or the other of the grooved rollers 28 so as to grip the mandrel against one or the other of grooved rolls 23 (at the same time throwing the opposite roll 28 upwardly) by actuating the downwardly-extending lever 29 through pitman 30 by means of either the upright lever 31 or the treadle 32. The lower set of rollers 23 are driven forward and back by suitable gearing (indicated by numeral 49, Fig. 17) from a common shaft 50, provided, if desired, with any suitable clutch mechanism. By this construction the mandrel is fed in one direction by lowering the rollers 28 to hold it against one of the rollers 23 and in the other direction by the same operation of the rolls on the other side through lever 29, and such construction constitutes the means for moving the mandrel referred to in the claims.

Immediately back of the mandrel-extracting apparatus is located a vertical yoke 33, connected by tension-rods 34 with the housing of the mill 3 against backward pressure of the mandrel, by which means the yoke is thus rigidly held and provides a positive and immovable back-stop. Pivotally mounted upon the face of the yoke 33 at 35 is a gate 36, provided with an extended arm 37, by which it may be raised out of engagement and in which gate is mounted, by means of a screw-thread, the backwardly-extending bolt 38, and forming a part thereof is the stop 39, adapted to limit the backward travel of the mandrel 11, and thus provides an accurate adjustment for the ball with relation to the rolls. The forward end of this stop is tapered, as shown, having a rounded tip, and the lower edge of the gate 36 is beveled off, as indicated at 40, so that if in lifting the gate the mandrel should be forced against it or against the tip it will slide off the gate or tip without damaging it and will also assist in lifting the gate. The stop is capable of very accurate adjustment in the gate by rotating it upon its screw-threads, and it is secured in position by a set-screw 41, bearing upon a key 42, the inner face of which is preferably threaded to correspond to the threads of the screw 38. In its normal position the stop is lowered, thus maintaining the bar and ball 22 in proper position for forming the tube, after which operation the gate 36 is thrown up out of the way, as indicated in Fig. 13, a slot 43 being provided in the yoke in such a position that the mandrel will travel backwardly through the yoke until it comes into contact with a buffer-block 44, which will arrest its backward movement. Such buffer-block is mounted in a suitable bearing 45 at the proper distance back of the yoke, which bearing is connected with the yoke by rods 46, thus rigidly holding it against back movement. Between the yoke and the buffer-block, supported in a suitable table 47, are a series of grooved rollers 48, upon which the mandrel will rest and be carried in its backward travel.

The operation is as follows: The mandrel having been advanced to its normal position with the ball in proper position between the rolls and the stop having been adjusted the hollow billet is placed in trough 4, and by the piston and head 5 is thrust forward through the bell-mouthed guide 8 and introduced between the rolls 7 and travels forwardly over the mandrel 11 upon rolls 10 and under rolls 12 until it has been completed for its full length. The advancing tube will come into contact with the support 24 and knock it away from under the mandrel, causing it to fall down out of the way. The gate is then thrown up. The back feeding-rolls of mandrel-extractor A are thrown into gripping contact with the mandrel, which then travels back through the tube, said tube coming into contact with a suitable abutment 52, the ball falling off in advance of the tube upon coming into contact with said tube, and the feed of the mandrel continues until it has been drawn clear out of the tube, when it will come into contact with the buffer-block 44 and stop, leaving the tube free and resting on the rollers 10. The treadle-lever 20 is then depressed, raising the upper rolls 12 and throwing the tube by arms 17 out upon the table. The mandrel is then fed forward, picking up its ball from trough 4', the ball being, if necessary, replaced by hand. The support 24 is readjusted, when the apparatus is again ready for another operation.

The advantages of the foregoing described apparatus will be appreciated by those familiar with the manufacture of seamless tubes, and it will be noted that the process is direct, rapid, and continuous. The tube is supported and maintained in alinement throughout the operation and made by forcing the pierced billet upon the mandrel, while the mandrel itself is supported and maintained in alinement and manipulated effectively for the objects in view.

The arrangement, details of construction, sizes, and other data are within the province of the designing engineer, and we do not desire to be confined to any particular detail as to these features, but to include them generally as within the scope of the following claims.

What we claim is—

1. In apparatus for manufacturing tubing, the combination with a table provided with means for supporting and moving a mandrel provided with a detachable ball; of a trough-shaped ball-support mounted at the end of the table adapted to receive and support the ball and to deliver it upon the end of the mandrel, substantially as set forth.

2. Apparatus for manufacturing seamless tubing consisting of rolls, a mandrel in advance of the rolls provided with a detachable ball, means for moving the mandrel, a tube-stripping abutment, a series of grooved rollers for supporting the tube in process, upper grooved rollers, means for raising such rollers, and a limiting-stop for the mandrel.

3. Apparatus for manufacturing seamless tubing consisting of rolls, a mandrel in advance of the rolls provided with a detachable ball, means for moving the mandrel, a tube-stripping abutment, a series of grooved rollers for supporting the tube in process, upper grooved rollers, means for raising such rollers provided with discharging-arms, and a limiting-stop for the mandrel.

4. In apparatus for manufacturing seamless tubing, the combination of rolls, a table in advance of the rolls provided with under-supporting-rollers and upper rollers mounted on a pivoted carrier so as to be capable of tilting, a mandrel provided with a piercing-ball, means for moving the mandrel forward and back, a tube-stripping abutment and a limiting-stop for the mandrel.

5. Apparatus for manufacturing seamless tubing consisting of rolls, a bell-mouthed guide leading into the rolls, a cylinder and piston adapted to force the tube in process into the guide, a mandrel beyond the rolls provided with a ball, means for adjusting the mandrel and ball with relation to the rolls, an extractor for the mandrel, a tube-stripping abutment, lower supporting-rollers, upper rollers with means for raising them out of engagement with the tube, means for discharging the tube, and a permanent stop for the mandrel at the limit of its outward travel.

6. Apparatus for manufacturing seamless tubing consisting of rolls, a bell-mouthed guide leading into the rolls, a cylinder and fluid-actuated piston mounted upon a table in front of the rolls, a mandrel beyond the rolls provided with a ball, a series of grooved rollers adapted to support the tube, upper guiding-rollers, means for raising the upper rollers, means for discharging the tube laterally, an extractor adapted to advance or withdraw the mandrel, a tube-stripping abutment, a pivoted gate provided with an adjustable limiting-stop, supporting-rollers and a permanent stop for the mandrel beyond such gate.

7. Apparatus for manufacturing seamless tubing consisting of rolls, a bell-mouthed guide leading into the rolls, a table in front of the rolls, a cylinder and fluid-actuated piston mounted thereon adapted to force the tube in process into the guide, a table beyond the rolls provided with a ball-support, grooved supporting-rollers mounted therein, an adjustable mandrel-support, upper grooved rollers with means for raising them, lifting-arms for the tube, a mandrel provided with a detachable ball, an extractor adapted to advance or withdraw the mandrel, a tube-stripping abutment, a yoke provided with a pivoted gate having an adjustable limiting-stop, a table beyond the yoke provided with supporting-rollers for the mandrel, and a permanent stop for the mandrel.

8. In apparatus for manufacturing tubing, a table provided with supporting grooved rollers and upper guiding-rollers with tilting supporting-bearings therefor.

9. In apparatus for manufacturing tubing, a table provided with supporting grooved rollers, upper guiding-rollers with tilting supporting-bearings therefor, and lifting-arms for discharging the tube from the table.

10. In apparatus for manufacturing tubing, a yoke provided with a pivoted gate having a lower beveled portion, and an adjustable limiting-stop set in the gate.

In testimony whereof we affix our signatures in presence of two witnesses.

JOHN H. KING.
EDWARD M. WOLFE.

Witnesses:
SUSIE W. ROUZER,
WILLIAM DICKS.